United States Patent [19]
Michel

[11] 3,756,650
[45] Sept. 4, 1973

[54] TARPAULIN COVER AND MOUNTING FRAME FOR OPEN TRUCK BODIES

[76] Inventor: Walter Michel, Gregor View Farm St., St. Gregor, Saskatchewan, Canada

[22] Filed: Apr. 9, 1971

[21] Appl. No.: 132,763

[52] U.S. Cl. ............................................ 296/137 C
[51] Int. Cl. ................................................ P60j 7/10
[58] Field of Search .................. 296/137 R, 100, 98, 296/137 B, 137 C, 105; 105/377

[56] References Cited
UNITED STATES PATENTS

| | | | |
|---|---|---|---|
| 3,416,835 | 12/1968 | Ohle | 296/100 |
| 3,472,548 | 10/1969 | Comisac | 296/98 |
| 2,559,310 | 7/1951 | McNavage | 296/105 |
| 3,481,645 | 12/1969 | Stepp | 296/105 |

Primary Examiner—Leo Friaglia
Assistant Examiner—Robert R. Song
Attorney—Roman J. Filipkonski

[57] ABSTRACT

A tarpaulin support framework comprising longitudinal side members mountable on the long side walls of an open-topped truck box and a transverse member overlying the front wall of the box, comprises vertical flanges which extend partly down the exterior surfaces of the box walls, and integral horizontal flanges extending partly over the opening. The longer horizontal flanges carry along their undersurfaces parallel hollow trackways formed with continuous slots opening downwardly. A plurality of sliding elements are captively guided in the trackways, preferably being short cylindric rods having depending hangers, and carry transverse cover-reinforcing beam elements by their ends. The tarpaulin is affixed to the beam elements which are spaced at uniform distances along the box length. To avoid binding due to box deformation under load, the suspension links between each beam end and the sliding element are pivotable. Control of rainwater is provided by inwardly upturned brackets fixed on the beam ends, shaping the tarpaulin margins when taut to form lateral spill-guiding walls, so that water or snow is discharged over the front and rear end walls of the box. The tarpaulin is retracted by sliding the rearmost beam element toward the front end wall.

20 Claims, 11 Drawing Figures

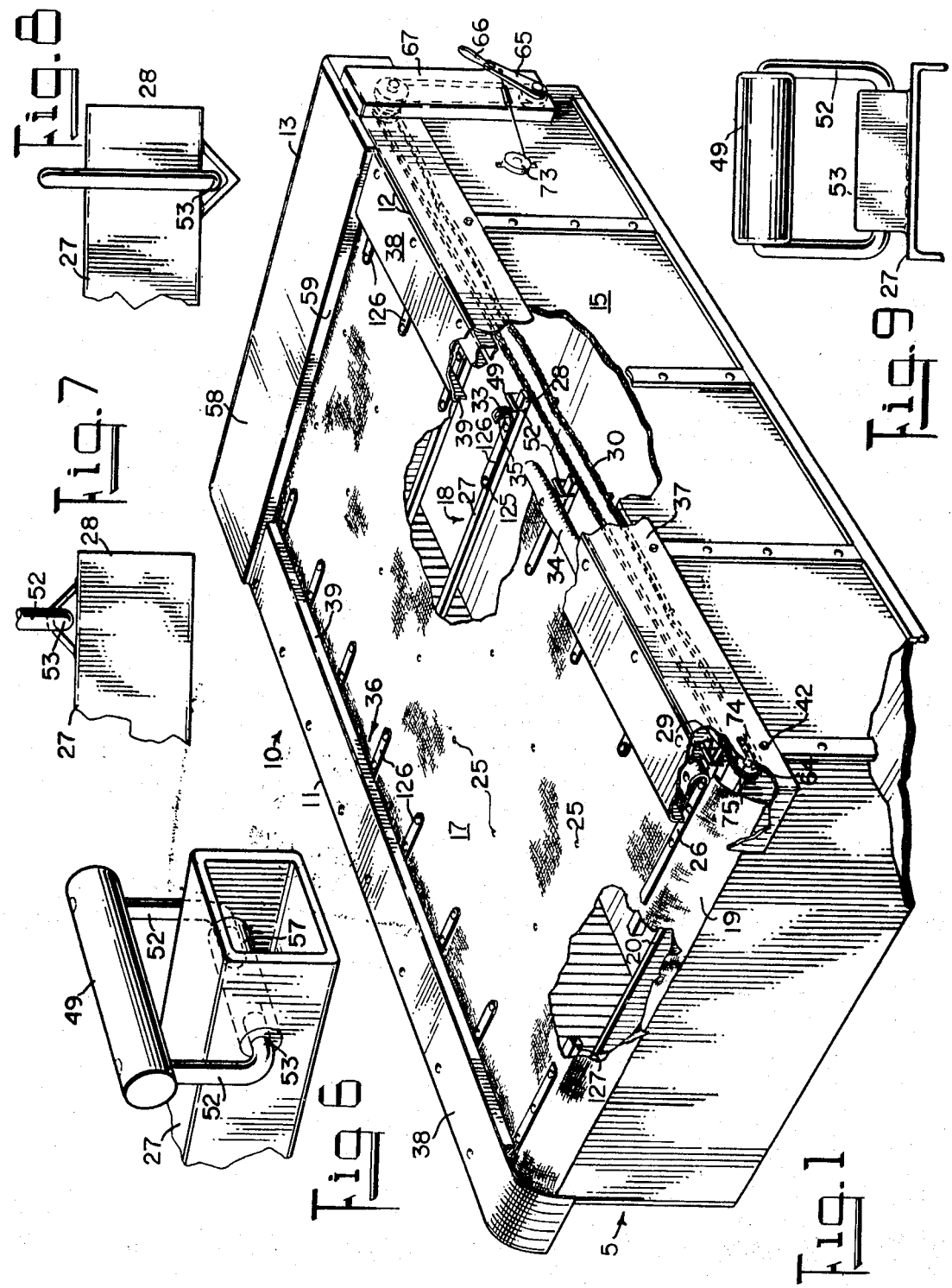

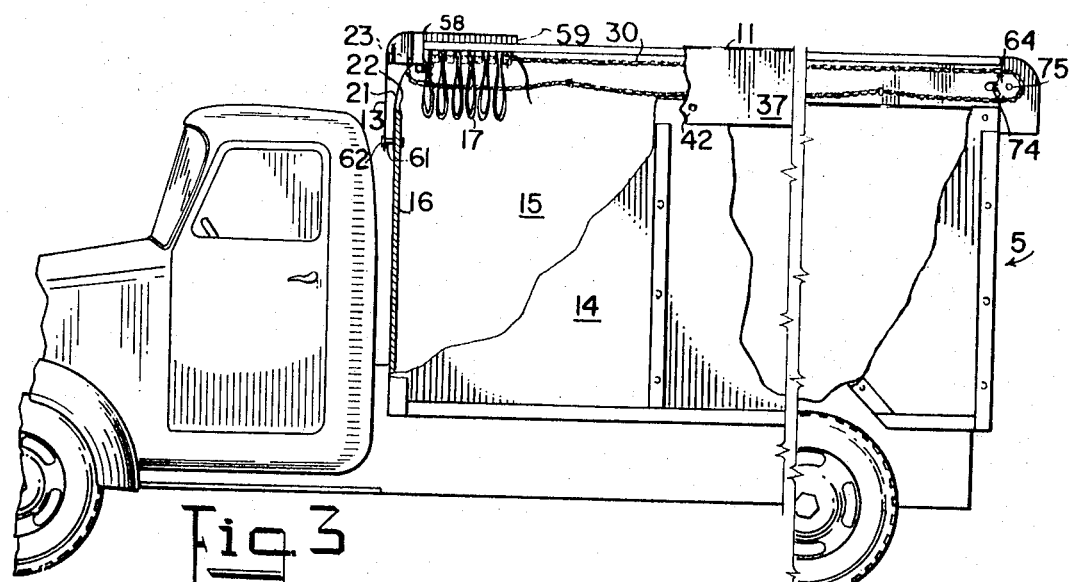
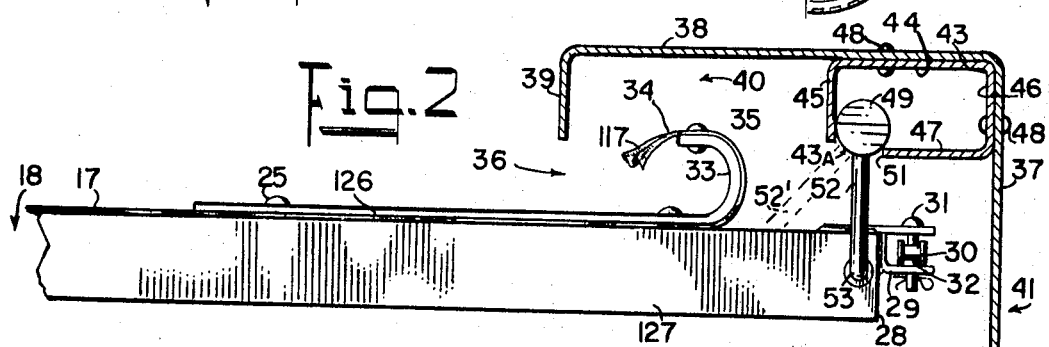
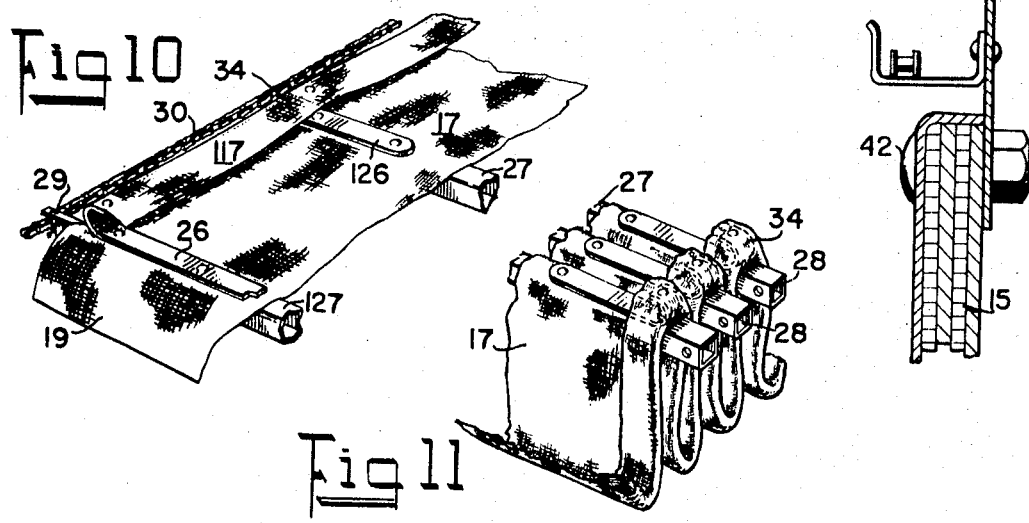

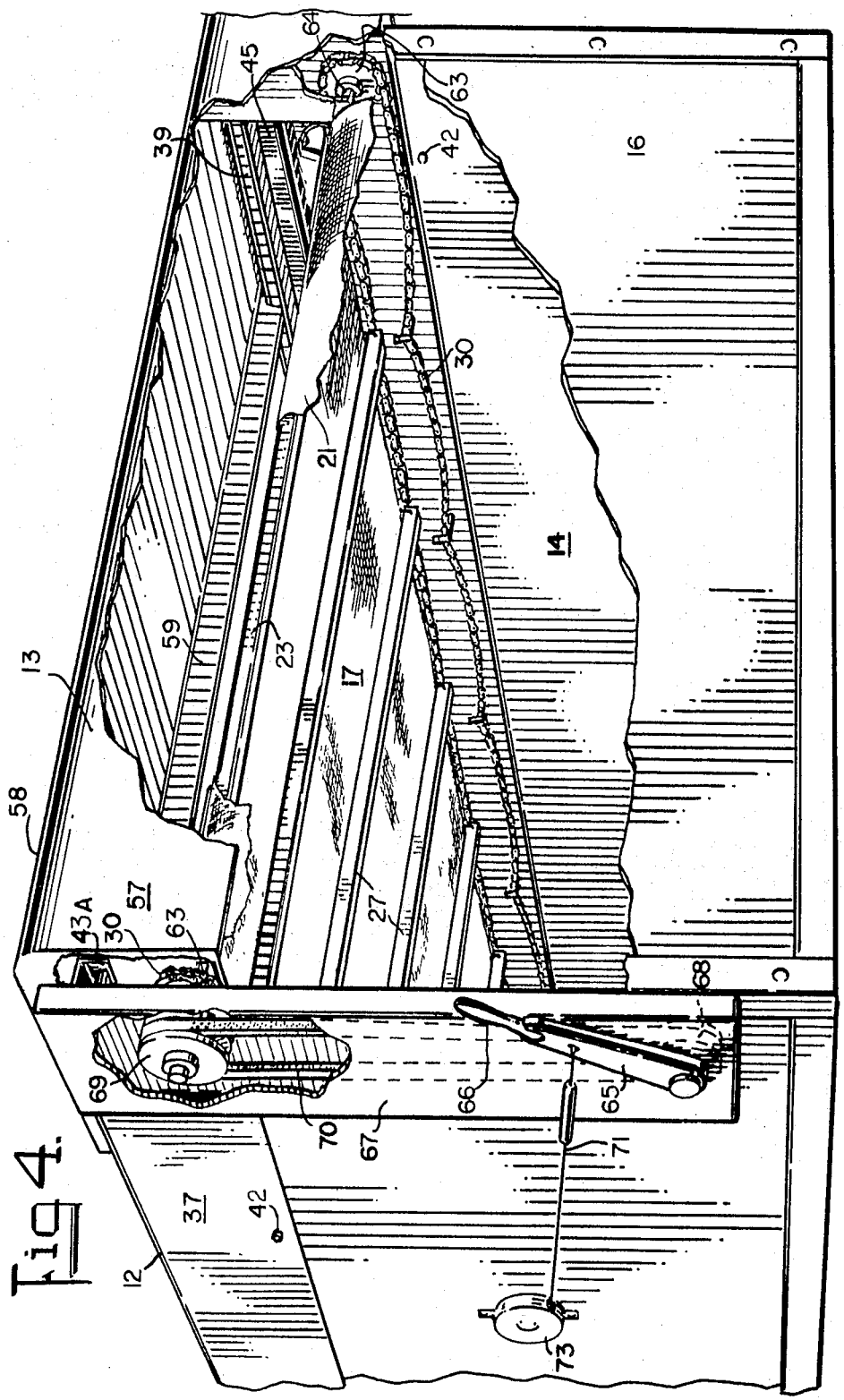

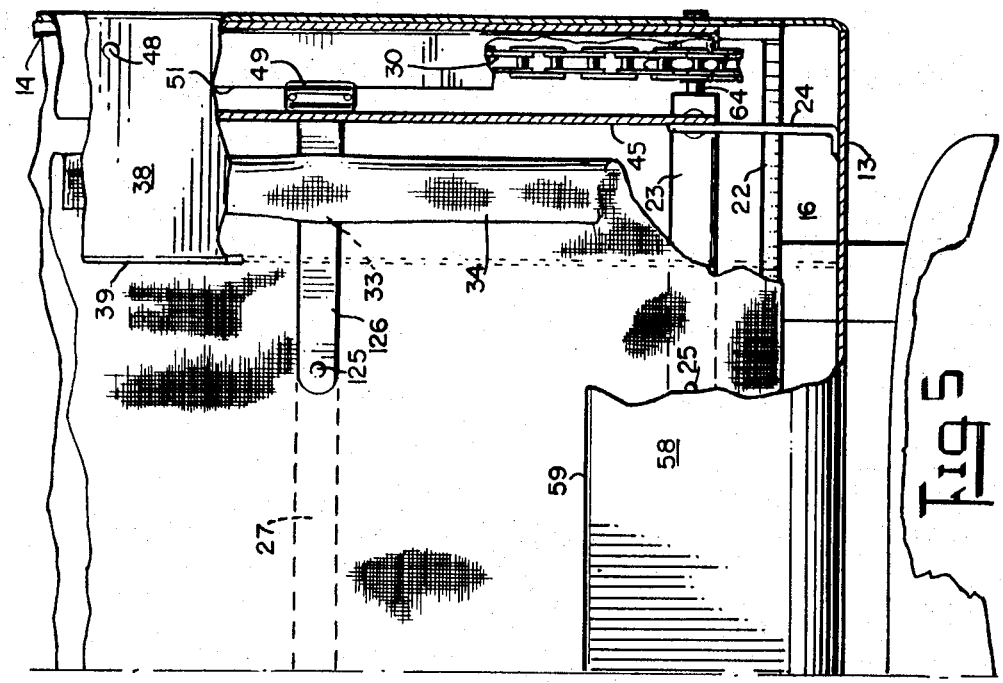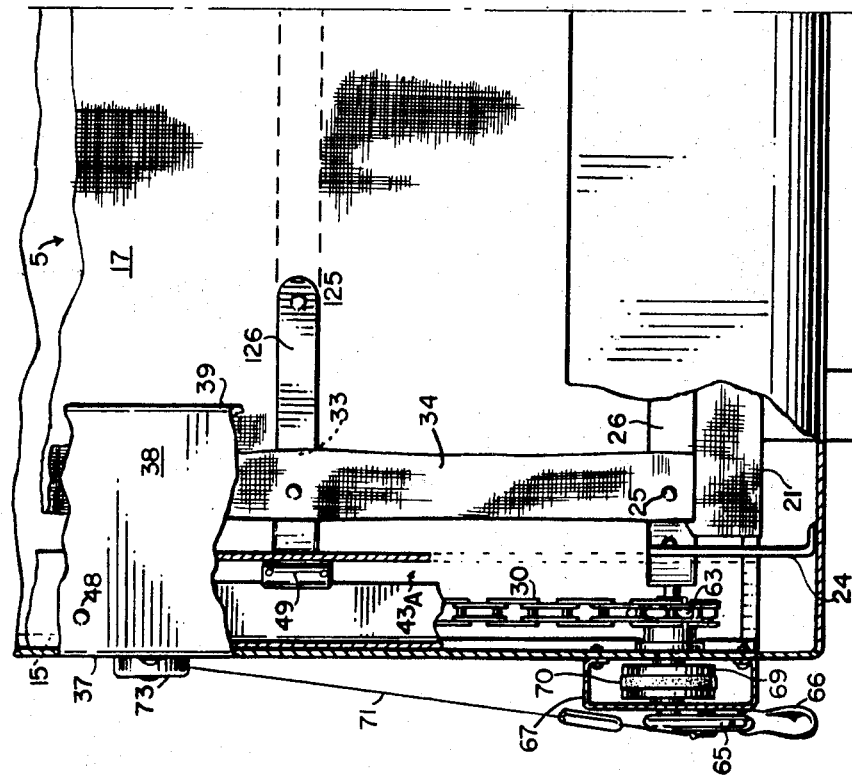

TARPAULIN COVER AND MOUNTING FRAME FOR OPEN TRUCK BODIES

This invention relates to rain-shedding tarpaulin covers and mounting frames therefor provided with means to freely retract or extend a bar-reinforced sheet deck relative to the top opening of a truck or trailer box despite changes in dimension of the opening due to vehicle motion and load stresses.

In the prior art of removable covers for open box bodies difficulty has been experienced in assuring free longitudinal movement of tarpaulin covers which have their side margins guidedly supported in trackways secured on the box margins, unless made extremely rigid, i.e. a one-piece steel body with heavy top flanges. By the nature of their construction the majority of boxes including wooden structural components are somewhat flexible. Representative art comprises U.S. Pat. No. 2,230,908 of Feb. 4, 1941 to R. J. Reimann or U.S. Pat. No. 2,594,910 of Apr. 29, 1952 to F. A. Germann both of which cover constructions fail to prevent leakage of rainwater into the load and which have trackways that would cause binding of sliding supports when deformed in any way. Internal pressure in a truck box due to a granular load, for example of a product such as grain or fertilizer, or even a load of bagged material, may distend the top margins and widen the opening by several inches at the mid-length position of the box as compared with the fixed width of the forward end wall. Because of the shaking and swaying deformation attending travel on a roadway, the box openings are continuously changing, causing wear on support and sliding surfaces of both the cover and its mounting arrangements.

Prior attempts to provide rainproof coverings which avoid these problems have led to devising hoop frames which extend upward from support guides located well below and outside the flexing margins of the box, as in Canada Patent No. 767,537 to P. Greenberg. The reinforced retractable cover proposed in Canada patent No. 469,266 to Bramble provides depending extensions of the fabric cover material outside the box walls, but its tracks do not allow free sliding when the box sides are distended. Constructions requiring bulky and costly mountings, particularly ridge pole supports, are disadvantageous for several reasons.

The improvements both in handling facility and in shedding of rainwater which the present invention brings about are achieved by a construction providing a linkage supporting each end of a transverse cover-reinforcing bar, each linkage being freely pivotable about two vertically-spaced pivot axes located respectively in horizontal end portions of the linkage, which end portions are disposed respectively in the end of the support bar and in a longitudinally-mounted trackway secured on the box margins. The further provision of incurved brackets carried by the support beams shapes and supports the side margins of the fabric sheet so that when the tarpaulin is longitudinally tensioned, retaining side walls are formed effective to prevent lateral spilling of rainwater, or other detrital material accumulated.

It is a principal object of this invention to provide a retractable cover and carrying frame suspending the cover from trackways by pivoting links permitting free closing or opening sliding movement of the cover relative to a truck box opening whether the box is loaded or empty;

Another object of this invention is to provide a bar-reinforced retractable cover for a truck box carried by pivoted suspension devices freely slidable along longitudinal guides which may have variation of transverse spacing along their length;

Yet another important object is the provision of fabric sheet support bars carrying upwardly-incurved end portions holding and shaping side edges of the sheet as water-retaining sidewalls when the sheet is tensioned longitudinally;

A further object is the provision of simple side seals for a rain-shedding cover resisting injection of accumulated water into a truck box either by sloshing action or wind force;

An ancillary object is the provision of a rain-shedding cover denying lateral access of water into a truck box but permitting free spilling beyond the front and rear ends of the box opening;

It is still another object of the invention to provide fabric sheet mountings for a reinforced cover that may be retracted safely into storage position even though accumulated precipitation or other material may be resting on its surface, by inherent controlled folding of the long side edges to trap and safely retain such material.

The invention may be more fully understood from a reading of the following description of the construction and mode of use of its specific embodiments, in conjunction with the accompanying figures of the drawing, comprising:

FIG. 1, showing a tarpaulin cover and mounting frame according to the invention, fitted on a truck box, in perspective view from the right rear;

FIG. 2, being a partial vertical cross-section through the mounting frame and side margin of the tarpaulin, in enlarged scale, at the located indicated by sectioning lines 2—2 of FIG. 1;

FIG. 3, showing in side elevation view, the mounting frame and tarpaulin in fully retracted position;

FIG. 4, showing a perspective view from the right front of the mounting frame and cover of FIG. 1, the box being partly cut away;

FIG. 5, showing in top plan view the forward portions of the mounting frame, reeling arrangements, and rain-spilling provisions;

FIG. 6, showing a hanger and slide element;

FIG. 7, and FIG. 8, showing two alternative pivoting support arrangements of hangers with respect to transverse frame members;

FIG. 9, showing an end elevation view of yet another form of hanger and slide element;

FIG. 10, showing in perspective view the water-retaining sidewalls formed along the tarpaulin when longitudinally tensioned; and, FIG. 11, showing the enfolding of side margins of the tarpaulin when retracted to form water-retaining cuffs.

Referring to the drawing, a frame-supported tarpaulin cover assembly according to the invention, generally designated 10, comprises the parallel side mounting frames 11, 12 and a transverse forward frame 13, respectively removably secured upon the long side walls 14, 15, and alternatively also secured upon the forward wall 16 of a truck box 5. The cover assembly also comprises a tarpaulin 17 of rain-resistant canvas, or equivalent sheet material, which is extensible from a forward storage position (see FIG. 3) over the truck box opening 18.

The rearward end of the tarpaulin terminates in a freely hanging flap 19 depending rearwardly of the top rear margin 20 of the truck box. The forward end terminates also in a flap 21 hanging below the top forward margin 22 of the box, which flap depends from a transverse anchor frame 23 secured to the mounting frame, as by brackets 24 fixed on the inner wall of the transverse mounting frame 13.

Anchor frame 23 may be any rigid, light-weight beam member capable of withstanding the tensioning loads imparted to the tarpaulin when fully extended, which loads are transmitted to the anchor frame by suitable fastenings 25. While numerous devices are available for the purpose, a highly satisfactory arrangement comprises the metal bar 26 clamping the fabric to a tubular anchor member by bolts 25 spaced along its length. Preferably the anchor member is a light guage tubular steel body such as 0.063 inch wall corrosion-proofed steel tube of 1½ inch square section.

Tarpaulin 17 is supported at intervals along its length by means of a number of like tubular beam members 27 similar to the anchor 23, each of which should be sufficiently strong to withstand any accumulation of precipitation or other material on a covered load, as well as the weight of an operator or handler who may have to walk upon the cover when partly retracted or fully extended. Each beam member 27 has a length such that the ends 28 are spaced from the side mounting frames 11, 12, a distance sufficient to permit free longitudinal sliding movement when the box sides 14, 15 are straight and parallel.

The most rearward beam member 127, seen in FIG. 2, carries end fitting 29 connecting the beam with an actuating element 30 such as an inextensible roller chain, through a pin 31 extending through a substitute roller 32. As may be seen from FIG. 1, the tarpaulin 17 may be held taut in covering relation over box opening 16, when the left and right chain loops 30 are suitably tensioned to urge beam member 127 to its fullest extended position, namely, just to the rear of box margin 20.

The tarpaulin 17 is connected to the end portions of each beam member 27 by suitable fastenings 25, for example by adhesives, by pop rivets, bolts, or self-tapping screws, and/or by a full length clamp bar 26. Preferably, a strap 126 having upwardly-inwardly curved ends 33, is affixed in resiliently clamped relation upon the end portion of each beam member by bolts or rivets 25. The tarpaulin width is sufficiently longer than the tubular elements 27 so that side margins 34 may be laminated to the outer side of curved ends 33 and affixed on the flat upper side 35 thereof by tubular rivets 125 or the like, permitting the material to droop toward the plane of the fabric sheet, but leaving a spill-space 36 for free movement of accumulated water.

Side mounting frames 11 and 12 comprise a vertical web or wall portion 37 and integral horizontal top flange 38, terminating in an inner down-turned flange 39 reaching within about one-half inch of the clamp straps 26 or brackets 136. The frame may be an extruded light metal section, a weldment, or a mechanically-joined composite structure, made up for example of light-section angle steel or sheet metal. The frame depicted as a practical embodiment comprises sheet steel strips of suitable gauge folded to provide a vertically and horizontally flanged unitary structure carrying a tubular trackway having a slot coextensive therewith. The height of vertical wall 37 may be any value sufficient to accommodate the curved bracket ends 33, plus a clearance distance designated 40, plus the depth of beam member 27, plus a mounting area 41 sufficient to permit clamped mounting as by bolt 42 on the truck box side wall such as 15. The width of horizontal flange 38 is chosen to permit a predetermined lateral swing of beam members 27 or 127, in either direction, with allowance for the lateral extent of bracket end portions 33, and for the width of slotted trackway 43. The trackway may be made integral with a frame 11, or 12, or as illustrated may comprise a longitudinally extended sheet metal formed tube body having three parallel fold lines providing a flat top wall 44, left and right vertical walls 45, 46, and a partial horizontal lower wall 47. The member is secured at the junction of flanges 37 and 38 of the side mounting frame, as by rivets 48, or alternatively by spot welding. Regardless of how the trackway is realized, the essential structural characteristics are a hollow interior space along its length, and a longitudinal guide slot 43A opening downwardly. In the embodiment of FIG. 2, slot 43A is disposed between side wall 45 and the lower wall 47, and may be, for example, about three-eighths to five-eighths inch wide depending on the size and loading of beam elements 27, and the lateral freedom in swinging to be permitted such elements. In any event, the slot width is sufficiently less than the diameter of a slide rod 49 riding in the trackway to retain the latter captive therein for longitudinal guided movement therein. As will appear from FIG. 2, each slide rod 49 is guided by wall 45 and edge 51 of bottom wall 47. Where a smaller swing angle is acceptable, slot 43A may be realized by spaced inturned horizontal flanges comprising bottom wall 47.

As will be seen from FIGS. 6, 7, 8 and 9, each slide rod 49 comprises a short length of round steel of other metal, or durable tough plastic such as nylon rod, and forms the upper horizontal member of a hanger assembly for each end portion of a beam element 27. Such assembly comprises the rod 49, a pair of slender depending links 52, and a lower transverse axle member or pair of stub axles 53 journalled in the end portion of a beam member 27 shows upper surface 54 is spaced a predetermined distance below the trackway 43. The mode of pivoting may be about a horizontal axis in member 53 transversely of and centered on the midheight position of a beam member 27 as in FIG. 6; or located above the surface 54 within a space 55 under an angle section member 56 welded to the surface 54 as in FIG. 7 or FIG. 9; or located below the member 27 within the angle section member 56 disposed on the underside as in FIG. 8.

Since the space occupied at the front of the truck box by the fully retracted set of beam elements 27 and 127 cannot be less than the sum of the lengths of individual rod elements 49 associated therewith, it is advantageous in certain installations to employ an arrangement as in FIG. 9 wherein the distance between the outside surfaces of vertical links 52 does not significantly exceed the rod length, nor exceed the width of beam member 27.

Because the movement of a vehicle ordinarily causes unceasing lateral swinging of the axle portions 53 relative to beams 27 and 127, over an extended period of time wear is inevitable unless a form of lubricated bearing is provided, as in FIG. 6, where the partial axle portions 53 comprise inturned ends of links 52 aligned longitudinally and received permanently in the ends of a tubular journal bearing 57 packed with lubricant such as grease, the assembly being made before welding the upper ends of links 52 upom the end surfaces of slide rod 49.

The relative diameter of slide rods 49 and the width of the slot 43A between walls 45 and 56 should be such that a swing of 30° or more from normal depending position of links 52, as indicated by limit position 52' in dashed outline (FIG. 2) is possible to accomodate outward bulging of truck box walls 14, 15, but the width should not be so great as to seat the rod too low therein, which would raise bearing pressure and aggravate wear. The rods 49 may be periodically greased to maintain free sliding.

The length of links 52 should also be chosen so that for a given spill space under flange 39, the upward relative movement of clamp straps 126 during an extreme swing does not cause them to strike this flange. In general a length of link 52 of about 2 to 4 inches has given good performance.

Transverse front mounting frame 13, hereinafter referred to as a housing, seen in FIGS. 1, 3, 4 and 5, comprises a folded sheet metal strip bent along parallel fold lines to form a vertical forward wall 57, a horizontal top wall 58, and a short down-turned flange 59 terminating a distance sufficiently above the tarpaulin 17 to permit forwardly-spilling water to move freely thereunder. The frame 13 is suitably supported on the truck box front wall 16, as by stand-offs 60 bolted as by bolts 61 thereto, and/or bolted to top flanges 38 of the side mounting frames 11, 12 by bolts 62.

The tarpaulin 17 may be extended over box opening 16 by causing chains 30, carried on driving sprockets 63 ganged together on a common shaft 64, and on rear idler sprockets 163, to urge beam member 127 as far rearwardly as the material will permit. A predetermined tension should then preferably be imposed to avoid flapping at highway speeds. One suitable arrangement comprises a crank arm 65 on the end of shaft 64, actuable by crank 66. Arm 65 is suitably journalled in a bearing carried by downwardly-extending frame member 67 fixed on side mounting frame 12 at the forward end of the truck box, enabling the operator to impart tensioning stress to the tarpaulin by moving crank 66 and thus turning driving pulley 68 and driven pulley 69 via belt 70. thus rotating shaft 64 and sprockets 63. When a predetermined tension has been imparted to the cover sheet, arm 66 may be locked by a cable or chain 71 hooked into catch 72 to prevent slackening. A spring-loaded reel 73 carried on the box is preferably employed to exert a constant tension on link 71.

Handle or crank 66 is preferably made removable, or folding, to avoid projecting out from the box side.

It is also envisaged that manual tensioning means may be directly coupled to shaft 64 which would extend outside to permit mounting crank arm 565 thereon. Various alternative arrangements may also be provided.

The rearward portion of side mounting frames 11, 12 is slotted at 74, to receive an axle bearing block 75 in which idler sprocket 64 is journalled, permitting tensioning of the chain loops 30 so that the slack side does not droop too far. The adjustment also enables the crank arm 65 to be maintained in a desired position a optimum tension.

The rearward end of each top flange 38 is preferably curved to provide a rain cover for the idler sprockets.

It will be apparent that the side margins of tarpaulin 17 form adequate side walls when the sheet is tensioned, capable of containing large spill flows of water that may move on the upper surface of the tarpaulin during a severe rainstorm. Such accumulated water is readily discharged either over the front flap 21 or rear flap 19, and thus cannot intrude into the truck box regardless of wind or weather. Because of the labyrinthal passage formed as best seen from FIG. 2, air-entrained contaminants are substantially denied entry to the load.

As will be seen from FIG. 11, any moisture clinging to the upper side of tarpaulin 17 cannot drip into the truck box when the cover is retracted, because of the cuff-forming folding action which results as actuating beam element 127 is urged forwardly to retract the tarpaulin. The action is that as the central area of the tarpaulin slackens, the flexible material droops and hangs in catenary folds between the rigid beam elements 27. Since the side margins of the tarpaulin are inturned and overlie the ends of the beam elements 27, and are fixed on the bracket end portions 33, the material inherently forms a cuff as consecutive slide rods 49 are brought together. The tarpaulin material forming the side margins should obviously not be so resilient as to tend to spring back in alignment with the central area portions as the material is slackened.

The enfolding action of the tarpaulin is best seen in FIG. 3.

Once the material has been subjected to the folding action, as may preferably be accomplished during the manufacture and packing, when any irregularities may be corrected by suitably hand crimping, subsequent retractions will "remember" the initial folding and cause the cuffs to form readily and automatically. The provision of a freely depending short flap 117 as best seen in FIGS. 2 and 10 assists in controlling the action.

I claim:

1. A cover structure for a vehicle having side and end walls defining an open container body, comprising
   a. a three-sided frame (10) having side (11, 12) and front end (13) frame members adapted for mounting on said vehicle in registry with the side and front end walls thereof, respectively, each of said side frame members including at its upper end a horizontal integral flange portion (38) that extends partially inwardly over the chamber defined within the container body;
   b. a pair of horizontal longitudinally-extending hollow trackway means (43) connected with said side frame members beneath the horizontal flange portions thereof, respectively, said trackway means being parallel and coextensive with said side frame members, each of said trackway means containing a downwardly facing slot (43a) that extends longitudinally of the corresponding side frame member;
   c. a plurality of captively guided slide elements (49) slidably mounted within each of said trackway means, respectively;
   d. a plurality of parallel horizontal beam elements (27, 127) disposed transversely between said trackway means, said beam elements being connected at opposite ends with slide elements contained in said trackway means, respectively, thereby to suspend said beam elements from said trackway means, respectively;

e. a flexible cover (17) secured at one end with said frame adjacent said end frame member, said cover being secured at uniform distances along its length to successive ones of said beam elements; and f. means (30) for displacing the rearmost beam element alternately in opposite directions along said trackway means, thereby to effect transverse folding of said cover when said rearmost beam element is retracted in the forward direction and to tauten said cover when said rearmost beam element is extended in the rearward direction.

2. A structure as set forth in claim 1 wherein the most forward beam element is fixed in said end frame member.

3. A cover structure as set forth in claim 2 wherein said slide elements have a horizontal length along said trackway not significantly greater than the corresponding dimension of a beam element.

4. Apparatus as defined in claim 3, wherein said end frame member has in a direction parallel with the longitudinal axes of said side frame members a horizontal dimension at least as great as the sum of the lengths of all of the slide elements contained in either of said trackway means, respectively.

5. A structure as set forth in claim 2 wherein the means to extend and retract said cover comprise a pair of inextensible flexible loops connected with end portions of said rearmost beam element each loop extending along the inside of the vertical flange of a side frame member and being reelably supported on pulleys disposed at the forward and rearward ends of said side frame member, said forward pulleys being ganged and actuable by a common shaft extending transversely in said housing.

6. A structure as set forth in claim 5 wherein the forward and rearward ends of said cover respectively extend forwardly and rearwardly of said fixed beam element and of said rearmost beam element to form depending flaps providing spillways for discharge of water, and the disposition of said beam elements is such that the discharge is exteriorly of said body opening.

7. A structure as set forth in claim 2 wherein the cover extends laterally under opposed horizontal flange portions of said frame and the side margins of said cover are supported and shaped by said beam elements to provide upwardly-inwardly and curved retaining side walls.

8. A structure as set forth in claim 7 wherein the end portions of said beam elements carry brackets clampedly affixing said cover thereto and said brackets are formed with upwardly-inturned end portions having said cover margins secured thereto.

9. A structure as set forth in claim 8 wherein the side margins of said cover terminate in depending flaps hanging adjacent the inner ends of said brackets to effect shaping of said side margins as water-retaining cuffs when said slide elements are brought together.

10. Apparatus as defined in claim 1, wherein said side frame members include at their adjacent longitudinal edges vertical terminal flange portions (39) that extend downwardly from said horizontal flange portions toward and spaced narrowly from said cover when said cover is in the extended condition.

11. A cover structure for a vehicle having side and end walls defining an open container body, comprising, a. a three-sided frame (10) having side (11, 12) and front end (13) frame members adapted for mounting on said vehicle in registry with the side and front end walls thereof, respectively, each of said side frame members including at its upper end a horizontal integral flange portion (38) that extends partially inwardly over the chamber defined within the container body;

b. a pair of horizontal longitudinally extending hollow trackway means (43) connected with said side frame members beneath the horizontal flange portions thereof, respectively, said trackway means being parallel and coextensive with said side frame members, each of said trackway means containing a downwardly facing slot (43a) that extends longitudinally of the corresponding side frame member;

c. a plurality of captively guided slide elements (49) slidably mounted within each of said trackway means, respectively;

d. a plurality of parallel horizontal beam elements (27, 127) disposed transversely between said trackway means;

e. suspension means connecting said beam elements at opposite ends with said slide elements, respectively, said suspension means including link means carried by each of said slide elements and depending loosely through the corresponding slot, said link means having lower ends connected in pivoting suspending support relation with end portions of said beam elements to permit lateral swinging of said beam elements between said side frame members about axes in said trackway means, the most forward one of said beam elements being fixed in said end frame member;

f. a flexible cover (17) secured at one end with said frame adjacent said end frame member, said cover being secured at uniform distances along its length to successive ones of said beam elements; and g. means (30) for displacing the rearmost beam element alternately in opposite directions along said trackway means, thereby to effect transverse folding of said cover when said rearmost beam element is retracted in the forward direction and to tauten said cover when said rearmost beam element is extended in the rearward direction, said side frame members also including at their adjacent longitudinal edges vertical terminal flange portions (39) that extend downwardly from said horizontal flange portions toward and spaced narrowly from said cover when said cover is in the extended condition.

12. A cover structure as set forth in claim 11 wherein said slide elements comprise cylindric rods and said link means comprise a pair of parallel rods having their upper end fixed to the ends of each slide element.

13. A structure as set forth in claim 12 wherein the lower ends of said link means comprise horizontally aligned portions comprising axles journalled in bearing means disposed in an end portion of beam element for rotative movement about a longitudinal pivot axis.

14. A structure as set forth in claim 13 wherein said axis is intermediate the upper and lower surfaces of a beam element.

15. A structure as set forth in claim 13 wherein the pivot axis is spaced adjacent the upper surface above said beam element.

16. A structure as set forth in claim 13 wherein the pivot axis is spaced adjacent the lower surface below said beam element.

17. A cover structure for open box bodies having longitudinal side walls subject to elastic deformation when loaded, comprising
 a. a cover-supporting frame including side and front end frame members having vertical wall portions corresponding in plan form to the exterior plan of said box body opening, said frame being adapted for mounting on said body side walls and having integral horizontal flanges extending inwardly over the sides and front end of said body opening;
 b. a pair of hollow parallel trackways carried by a respective pair of parallel horizontal flanges of said frame, each trackway containing a downwardly opening slot coextensive therewith;
 c. a plurality of rod elements slidably mounted and captively retained in said trackways, said rod elements being pivotally supported by said slots;
 d. a flexible cover secured at one end within said frame adjacent the front end member thereof, said cover being so dimensioned that the side margins thereof underlie the opposed horizontal flange portions of said side frame members and the end margins of said cover extend beyond said body opening;
 e. and a plurality of transverse cover-supporting beam elements each having a length substantially the same as the spacing between said slots, said beam elements being suspended from said rod elements by links depending freely through said slots and pivotally connected with the ends of the beam elements to permit predetermined change of lateral dimensions of said body opening when said cover is extended thereover without binding said rods in said slots.

18. A cover structure as set forth in claim 17 having straps clampedly secured on the upper surface of each beam element, a free end portion of each strap being bent upwardly in U - shape with legs horizontal, and the margins of the cover are secured about the U to shape the said margins as a retaining side wall when said cover is taut.

19. A cover structure as set forth in claim 18 wherein each horizontal flange has a terminal vertical flange extending toward but spaced from said strps a distance sufficient to permit lateral swinging of said elements.

20. A cover structure as set forth in claim 18 wherein said rod elements have a length along a trackway not significantly greater than the corresponding dimension of a beam element, and the front horizontal flange has a length not less than the sum of all rod elements in a trackway.

* * * * *